(12) United States Patent
Sugimura et al.

(10) Patent No.: US 8,249,420 B2
(45) Date of Patent: Aug. 21, 2012

(54) REPRODUCING DEVICE

(75) Inventors: Naozumi Sugimura, Yokohama (JP);
Takuya Imaide, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 1021 days.

(21) Appl. No.: 12/183,782

(22) Filed: Jul. 31, 2008

(65) Prior Publication Data

US 2009/0041425 A1    Feb. 12, 2009

Related U.S. Application Data

(63) Continuation of application No. 10/960,059, filed on Oct. 8, 2004, now Pat. No. 7,835,626.

(30) Foreign Application Priority Data

Oct. 10, 2003    (JP) .................................. 2003-351510

(51) Int. Cl.
*H04N 9/80*    (2006.01)
(52) U.S. Cl. ........ 386/241; 386/211; 386/214; 386/220; 386/246
(58) Field of Classification Search .................. 386/211, 386/214, 220, 246
See application file for complete search history.

(56) References Cited

U.S. PATENT DOCUMENTS

| 5,103,317 A | 4/1992 | Nomura |
| 5,187,589 A | 2/1993 | Kono et al. |
| 6,678,466 B2 | 1/2004 | Yagi et al. |
| 6,954,584 B2 | 10/2005 | Kashiwagi et al. |
| 7,263,276 B2 | 8/2007 | Ando et al. |

FOREIGN PATENT DOCUMENTS

| JP | 07-030814 | 1/1995 |
| JP | 2002-247526 | 8/2002 |

*Primary Examiner* — Jamie Atala
(74) *Attorney, Agent, or Firm* — Antonelli, Terry, Stout & Kraus, LLP.

(57) ABSTRACT

A reproducing device for playing back data from a recording medium, including: play back circuits for reading first stream data, which includes first video data, first audio data, and first subpicture data, from a recording medium; download data storage circuits for storing second stream data, which includes at least one of second video data, second audio data and second subpicture data downloaded via a network; and selection circuits for conducting at least one of: switching from said first video data to said second video data; switching from said first audio data to said second audio data, and switching from said first subpicture data to said second subpicture data; wherein data which is newly switched by said selection circuits and data which is not switched by said selection circuits are synchronously superimposed and outputted.

3 Claims, 5 Drawing Sheets

REPRODUCING DEVICE

CROSS REFERENCE TO RELATED APPLICATION

This is a continuation of U.S. application Ser. No. 10/960,059, filed Oct. 8, 2004, now U.S. Pat. No. 7,835,626, issued Nov. 16, 2010, which relates to application Ser. No. 12/058,879, filed Mar. 31, 2008, application Ser. No. 12/058,888, filed Mar. 31, 2008 and application Ser. No. 12/183,773, filed Jul. 31, 2008. This application relates to and claims priority from Japanese Patent Application No. 2003-351510, filed on Oct. 10, 2003. The entirety of the contents and subject matter of all of the above is incorporated herein by reference.

BACKGROUND OF THE INVENTION

The present invention relates to a playback technique for reading data from an optical disk or other recording medium and reproducing pictures and sound, and, more particularly, the invention relates to a playback technique that is capable of simultaneously playing back data reproduced from a recording medium and data downloaded via a network.

The use of a DVD or other similar recording medium makes it possible to distribute/sell motion pictures and other video content with ease. The user can play back such a recording medium using a reproducing device at a desired time. Not only video and audio data, but also sub-picture data and other additional data is recorded as a video content. The additional data is reproduced and displayed as needed together with the video and audio data.

Further, a technology disclosed, for instance, by Japanese Patent Laid-open No. Hei 7-30814 is capable of receiving an audio data transmission, to which multi-language sub-picture data is added, and of displaying a subtitle on a screen in a user-selected language.

SUMMARY OF THE INVENTION

Meanwhile, there is a scheme for downloading sub-picture data and other additional data via a network. For instance, if sub-picture data for a different language is downloaded for use, it is possible to use such a language even if it is not prerecorded on a disk. Since such a scheme eliminates the need for prerecording sub-picture data for a plurality of languages, it is possible to reduce the disk preparation cost and period.

The recording capacity of the disk is limited. If the user downloads only the subtitle and audio data for a required language after disk acquisition, there is no need to prerecord unnecessary data on the disk, thereby making it possible to effectively use the space on the disk.

When the data recorded on the disk and the data downloaded via a network are to be synchronously output, it is necessary to change data that has been entered into an audio decoder, sub-picture decoder, or other decoder. More specifically, it is necessary to choose between the use of the audio data recorded on the disk or the use of the downloaded audio data.

It is an object of the present invention to provide a playback technique for playing back video, audio, and sub-picture data in an arbitrary combination when the video, audio, and sub-picture data are entered through two channels.

To solve the above-described problems, the present invention provides a reproducing device, which comprises playback circuits, download data storage circuits, and selection circuits. The playback circuit reads first stream data, which includes first video data, first audio data, and first sub-picture data, from a recording medium. The download data storage circuit stores second stream data, which includes second video data, second audio data, and second sub-picture data downloaded via a network. The selection circuits switch from the first video data to the second video data, from the first audio data to the second audio data, and/or from the first sub-picture data to the second sub-picture data. The reproducing device synchronously outputs the data newly selected by the selection circuits and the data continuously selected by the selection circuits.

The second stream data may be the data that was reproduced from a second recording medium and not downloaded data. Further, the second stream data may also be the data that is recorded on the same recording medium as for the first stream data and was subjected to time-multiplexed playback.

When video, audio, and sub-picture data are entered through two channels, the present invention makes it possible to play back the video, audio, and sub-picture data in an arbitrary combination.

DETAILED DESCRIPTION OF THE PREFERRED EMBODIMENTS

Various embodiments of the present invention will now be described.

Figure 1:
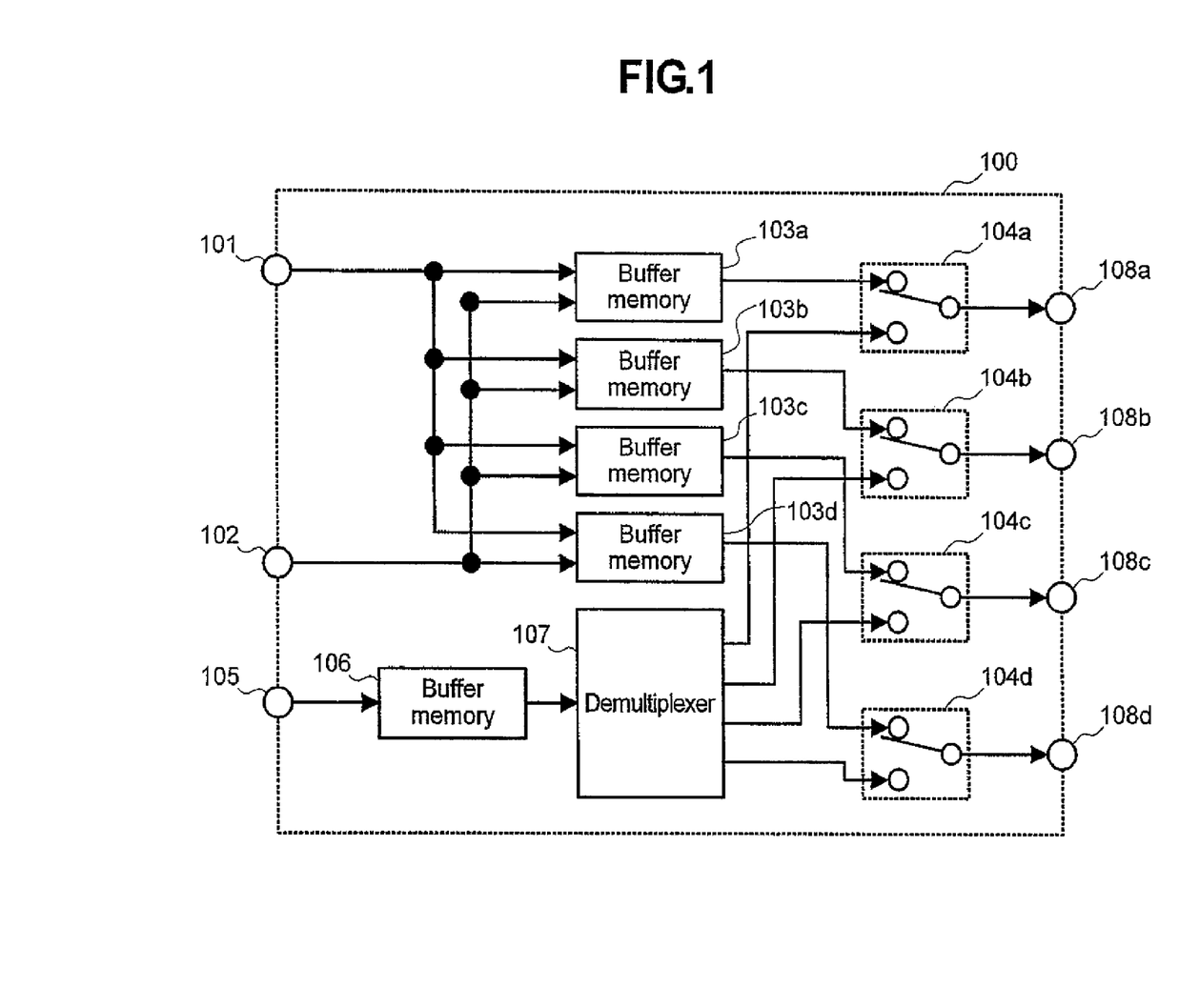
FIG. 1 is a block diagram illustrating the structure of a packet switcher according to a first embodiment of the present invention.

FIG. 1 is a block diagram illustrating the structure of a packet switcher 100 according to a first embodiment of the present invention.

The packet switcher 100 includes a download stream data input terminal 101, a control signal input terminal 102, buffer memories 103a to 103d, selector switches 104a to 104d, a playback stream data input terminal 105, another buffer memory 106, a demultiplexer 107, and packet output terminals 108a to 108d.

The buffer memory 103a buffers audio packets within downloaded stream data; a selector switch 104a is operated for making an audio packet selection; and an audio packet output terminal outputs the audio packets. The reference numerals 103b, 104b, and 108b denote similar elements which form a video packet output system. Similarly, the reference numerals 103c, 104c, and 108c denote elements which form a subtitle packet output system. The reference numerals 103d, 104d, and 108d denote elements of a graphics packet output system.

Figure 2:
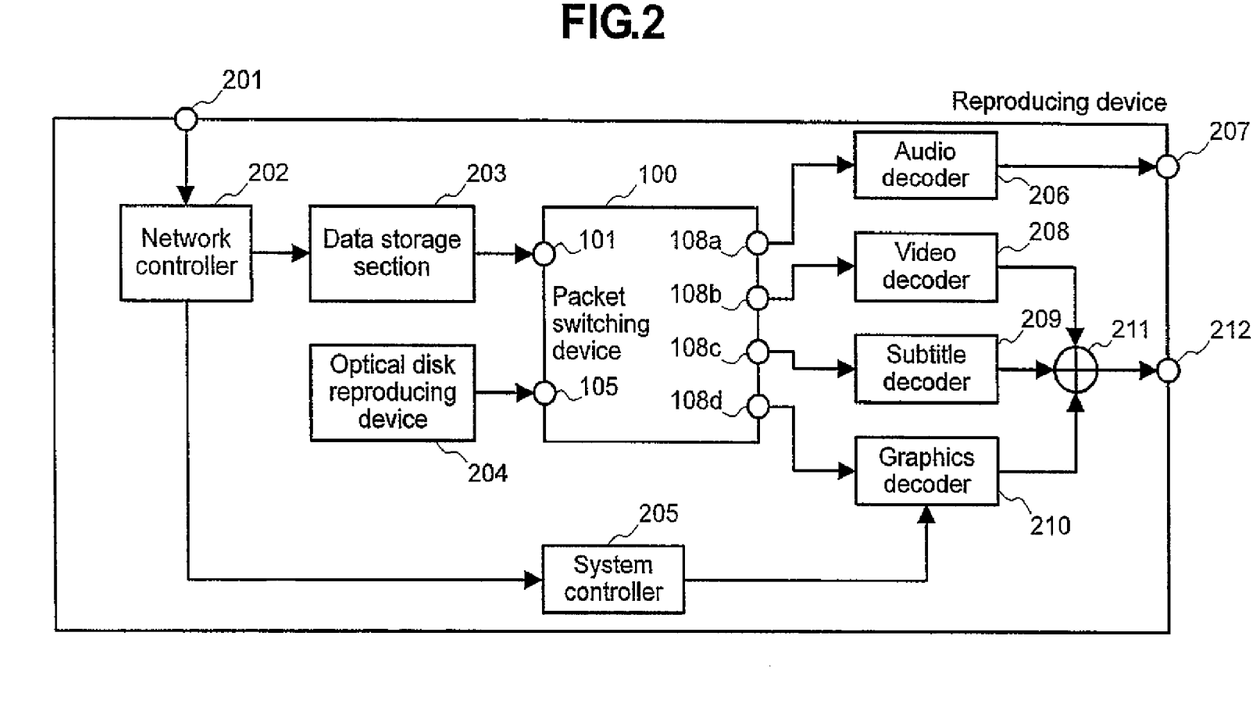
FIG. 2 is a block diagram illustrating the structure of a reproducing device.

FIG. 2 is a block diagram illustrating the structure of a reproducing device according to the present invention. The following description assumes that the reproducing device is equipped with the packet switcher 100 shown in FIG. 1. The block diagram in FIG. 2 also shows various data flows. The components of the reproducing device are controlled by a system controller 205.

In FIG. 2, the reproducing device includes the packet switcher 100; a network input/output terminal 201; a network controller 202; a data recording unit 203; an optical disk reproducing unit 204; a system controller 205; an audio decoder 206; an audio output terminal 207; a video decoder 208; a sub-picture decoder 209; a graphics decoder 210; a video synthesizer 211; and an video output terminal 212.

Figure 3:
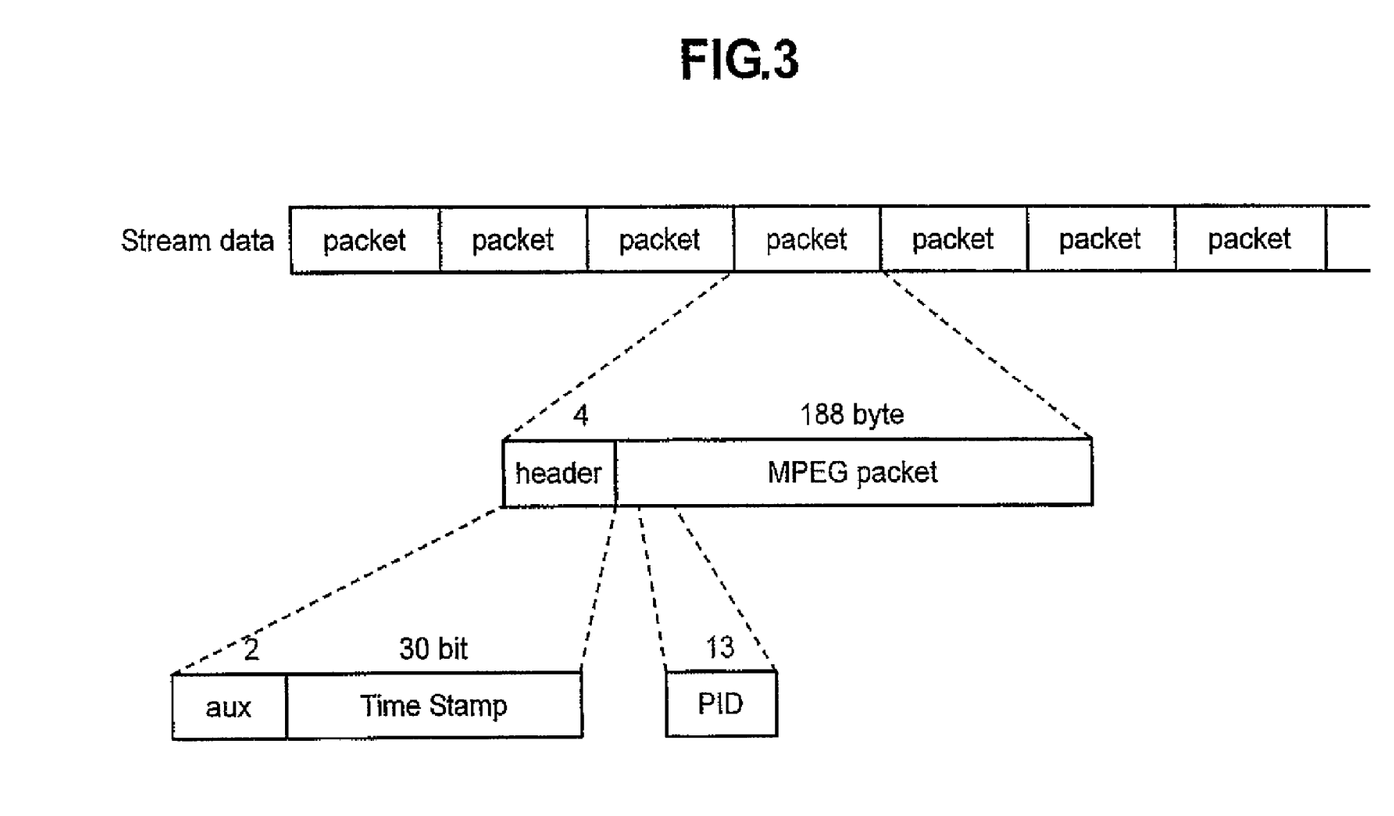
FIG. 3 is a diagram which illustrates the stream structure and packet structure.

FIG. 3 illustrates the structure of stream data. The stream data according to the present embodiment comprises a plurality of 188-byte MPEG packets to which 4-byte header data is attached. The 4-byte header data includes a 30-bit timestamp (time data).

The MPEG packets are not always contiguous when transferred. When the amount of data is small, the packet intervals are increased. When the amount of data is large, on the other hand, the packet intervals are decreased. At the time of stream file recording, the recording time of each entered MPEG packet is attached to each packet and is recorded as a timestamp. At the time of playback, the timestamp is used to reproduce the packet transfer intervals by adjusting the output timing of each packet.

The leading end of each MPEG packet contains 13-bit packet ID information, which is referred to as a PID (Packet IDentifier). The PID has a number that varies with the packet type. When the PID is checked, it is easy to determine the type of data contained in each packet.

The data recorded on an optical disk and the data downloaded via a network are both in a stream data format, as shown in FIG. 3.

First of all, the operation to play back the data recorded on an optical disk without using the downloaded data will be described.

In the optical disk reproducing unit 204, an optical disk is set on which the data necessary for playing back contents (motion picture, etc.), such as video, audio, and sub-picture data, are recorded.

A user enters a playback start command with a playback button on a remote controller (not shown). When the playback start command enters the system controller 205 via a remote controller receiver (not shown), the system controller 205 controls the optical disk reproducing unit 204 in order to start playing back the data from the optical disk.

More specifically, the file management data recorded on the optical disk is first read. The file management data contains the filenames (file identifiers) of all of the files recorded on the optical disk, the recording start sector location of each file, the data length of each file, and attribute data about each file. When these data are used, the system controller 205 can handle the data recorded on the optical disk as files.

After the file management data is acquired, the files required for content playback are sequentially read. The files to be sequentially read include a play list file, which indicates the order in which the files are to be played back; a menu data file, which displays a menu screen; and a stream file, which contains actual stream recordings.

The system controller 205 causes display circuits (not shown) to open a menu screen by using the menu data file for the purpose of allowing the user to select a desired content stream file.

For stream playback purposes, the optical disk reproducing unit 204 reads the stream file from the optical disk. The read stream file is handled as stream data and is entered into the buffer memory 106 via the input terminal 105 of the packet switcher.

The stream data reproduced from the optical disk is recorded in a packet format, as shown in FIG. 3. A 30-bit timestamp is attached to each packet as time data.

The stream data entered into the buffer memory 106 is output from the buffer memory 106 in accordance with the time indicated by the timestamp attached to each packet, and it is then entered into the demultiplexer 107. At this time, the timestamp is removed so that a 188-byte MPEG packet enters the demultiplexer 107.

In the demultiplexer 107, each entered packet is demultiplexed into a video packet, an audio packet, a subtitle packet, and a graphics packet, depending on the PID, and then the packet is output.

As indicated in FIG. 3, the leading end of each MPEG packet contains a 13-bit PID (packet identification number). This PID is used for packet demultiplexing. It is assumed that the relationship between each PID and the data is predefined.

The signals derived from the demultiplexing process performed by the demultiplexer 107 are output to output terminals 108a through 108d via the selector switches 104a to 104d, respectively. When the data on the optical disk is to be used, the selector switches 104a to 104d are controlled so as to select the output of the demultiplexer 107.

The audio packet, which is derived from the demultiplexing process performed by the demultiplexer 107, is output to output terminal 108a and then input into the audio decoder 206. The audio decoder 206 decodes the audio packet and generates an audio signal from the audio output terminal 207.

The video packet enters the video decoder 208 via output terminal 108b. Similarly, the subtitle packet enters the sub-picture decoder 209 via output terminal 108c, and the graphics packet enters the graphics decoder 210 via output terminal 108d.

The decoded video data, which is generated by the video decoder 208, the decoded sub-picture data, which is generated by the sub-picture decoder 209, and the decoded graphics data, which is generated by the graphics decoder 210, are synthesized by the video synthesizer 211, which performs a superimposition. The resulting synthesized data is output from the video output terminal 212. The video signal output in this manner is then displayed on an external television screen or the like.

As described above, various data recordings on the optical disk are reproduced and then output as an audio signal and a video signal.

The operation performed for downloading stream data and synchronously playing back the downloaded stream data and the stream data recorded on the optical disk will now be described.

If user-desired sub-picture data or audio data is not recorded on the optical disk, the user downloads the sub-picture data and audio data via the network controller 202. The user operates the remote controller (not shown) to issue an instruction for a download and sends a download start command to the system controller 205.

Upon receipt of the download start command, the system controller 205 connects to a network by using the download data recorded on the optical disk that is inserted into the optical disk reproducing unit 204, and attempts to perform a download. The download data contains the URL (Unified Resource Locator) of a connection destination server. The connection to a networked server is established in accordance with the URL.

A list of downloadable data is supplied to the networked server. Listed graphics data is transferred via the network input/output terminal 201, network controller 202, system controller 205, graphics decoder 210, video synthesizer 211, and video output terminal 212, and then it is displayed on an external television screen or the like. The user can view the listings displayed on the screen and select the data to be downloaded.

The data selected by the user is handled as stream data and is transmitted from the server to the reproducing device via the network. The network controller 202 stores the received stream data in the data recording unit 203.

The stream data to be downloaded contains audio data, sub-picture data, graphics data, and video data. This data can be individually downloaded in accordance with a user selection. The user may download only one stream data or a plurality of stream data. Downloaded stream data is to be stored in the data recording unit 203.

The data recording unit 203 may be a storage medium, such as a hard disk drive, or a semiconductor memory device, such as a RAM or a flash memory.

The downloaded stream data is similar to the stream data that is recorded on the optical disk, and it is encoded as an MPEG packet containing a timestamp. After completion of the stream data download, the data on the optical disk and the downloaded stream data are synchronously played back.

First of all, the user presses a playback start button (not shown) on the remote controller to enter an optical disk playback start command. The system controller 205 receives the user's playback start command and starts to perform a playback operation. Since the downloaded stream data is recorded in the data recording unit 203 at this stage, the system controller 205 opens a confirmation window on an external television screen or the like via the graphics decoder 210, video synthesizer 211, and video output terminal 212, thereby asking the user whether synchronous playback is needed. If the user selects a synchronous playback option, the system controller 205 plays back the downloaded stream data, which is stored in the data recording unit 203, in synchronism with the playback of the stream data on the optical disk.

Thus, the specified stream data is reproduced from the optical disk. The reproduced stream data then enters the buffer memory 106 via the input terminal 105 of the packet switcher 100. The stream data entered in the buffer memory 106 is input into the demultiplexer 107 at a time according to the timestamp, demultiplexed into an audio packet, video packet, subtitle packet, and graphics packet in accordance with the PID, and entered respectively into selector switches 104a through 104d.

Meanwhile, the stream data that is stored in the data recording unit 203 and designated for synchronous playback is read from the data recording unit 203 and input into buffer memories 103a through 103d via the input terminal 101 of the packet switcher. The system controller 205 issues an instruction via input terminal 102 to specify which buffer memory (102a to 103d) is to be written into. The system controller 205 simultaneously carries out data read control, which controls the above-mentioned reading of data from the data recording unit 203, and data write control, which controls the writing of data into buffer memories 103a through 103d.

For ease of explanation, the following description assumes that the downloaded sub-picture data and audio data and the video data on the optical disk are to be synchronously played back.

The stream data for synchronous playback is read from the data recording unit 203 on an individual packet basis and is written into buffer memory 103. This stream data read operation is performed for each stream data type according to the PID. The subtitle packet is written into buffer memory 103c, whereas the audio packet is written into buffer memory 103a. In these operations, the packets are read from the data recording unit 203 and written into buffer memories 103a and 103c in a time division multiplexed manner so as to prevent buffer memories 103a and 103c from overflowing. In time division multiplexing, the operation for writing the audio packet into buffer memory 103a and the operation for writing the subtitle packet into buffer memory 103c are repeatedly performed. The system controller 205 performs the reading from the data recording unit 203 and the writing into the buffer memories 103a and 103c.

Buffer memory 103a, which handles audio data, adjusts the audio packet output timing in accordance with the timestamp of each audio packet being written. The audio packets enter selector switch 104a from buffer memory 103a with a predetermined timing. A 4-byte header, which includes a timestamp, is removed from each audio packet when it enters the selector switch 104a.

Similarly, buffer memory 103c, which handles sub-picture data, adjusts the output timing of each subtitle packet, and enters subtitle packets into selector switch 104c.

Meanwhile, the stream data reproduced from the optical disk enters the buffer memory 106 via input terminal 105. The buffer memory 106 outputs packets with a predetermined timing according to the timestamp attached to each packet. Multiplexing is performed so that the stream data reproduced from the optical disk contains a video packet, an audio packet, a subtitle packet, and a graphics packet.

The stream data output from the buffer memory 106 enters the demultiplexer 107 with a predetermined timing according to the timestamp. The demultiplexer 107 demultiplexes the entered stream data, separates it into various types of data packets, and enters them respectively into selector switches 104a through 104d.

Buffer memories 103a through 103d and the buffer memory 106 adjust the output timing so as to synchronously play back the downloaded data and the data on the optical disk.

When downloaded stream packets are to be played back, selector switches 104a through 104d perform switching operations so as to select the outputs from buffer memories 103a through 103d. When the stream data on the optical disk is to be played back, selector switches 104a through 104d perform switching operations so as to select the output of the demultiplexer 107.

When the downloaded sub-picture data and audio data and the video data and graphics data on the optical disk are to be synchronously played back, selector switch 104c, which handles subtitle packets, and selector switch 104a, which handles audio packets, are set to buffer memories 103c and 103a, respectively, and selector switch 104b, which handles video packets, and selector switch 104d, which handles graphics packets, are set to the demultiplexer 107. Selector switches 104a through 104d are operated in the above-described manner by the system controller 205.

Selector switch 104a selects the output of buffer memory 103a and enters it into the audio decoder 206. In other words, the downloaded audio packets, which are stored in the data recording unit 203, are input, decoded, and output to the audio output terminal as audio data.

Selector switch 104b selects the output of the demultiplexer 107 and enters it into the video decoder. In other words, the video packets reproduced from the optical disk are input, decoded, and input into the video synthesizer 211 as video data.

Selector switch 104c selects the output of buffer memory 103c and enters it into the sub-picture decoder 209. In other words, the downloaded subtitle packets, which are stored in the data recording unit 203, are input, decoded, and input into the video synthesizer 211 as sub-picture data.

Another selector switch selects the output of the demultiplexer 107 and enters it into the graphics decoder 210. In other words, the graphics packets reproduced from the optical disk are input, decoded, and input into the video synthesizer 211 as graphics data.

In the video synthesizer 211, decoded video data, subtitle video data, and graphics video data are entered, subjected to a superimposition process (superimpose), and are output as a video signal. The output video signal is transferred out from the video signal output terminal and displayed on an external television screen or the like.

As described above, the stream data reproduced from the optical disk and the downloaded stream data can be synchronously played back.

The foregoing embodiment assumes that an optical disk is used as a contents recording medium. However, the present invention is not limited to the use of an optical disk, but is also applicable to the use of a magnetic recording medium or a semiconductor recording medium, etc.

In the reproducing device shown in FIG. 2, the optical disk reproducing unit 204 is separated from the data recording unit 203. Alternatively, however, these components may be integrated into a single unit. For example, the optical disk may be provided with a recording area, which is used as the data recording unit 203. In a read process, the stream data prerecorded on the optical disk and the stream data downloaded via a network may be read in a time division manner and entered into the packet switcher 100.

It has been assumed in the description of the foregoing embodiment that the stream data downloaded through a network and the stream data reproduced from the optical disk are synchronously played back. Alternatively, however, the reproducing device shown in FIG. 2 may be configured so that the network input/output terminal 201, network controller 202, and data recording unit 203 are replaced by another optical disk unit to synchronously play back the stream data reproduced by two optical disk units.

Figure 4:
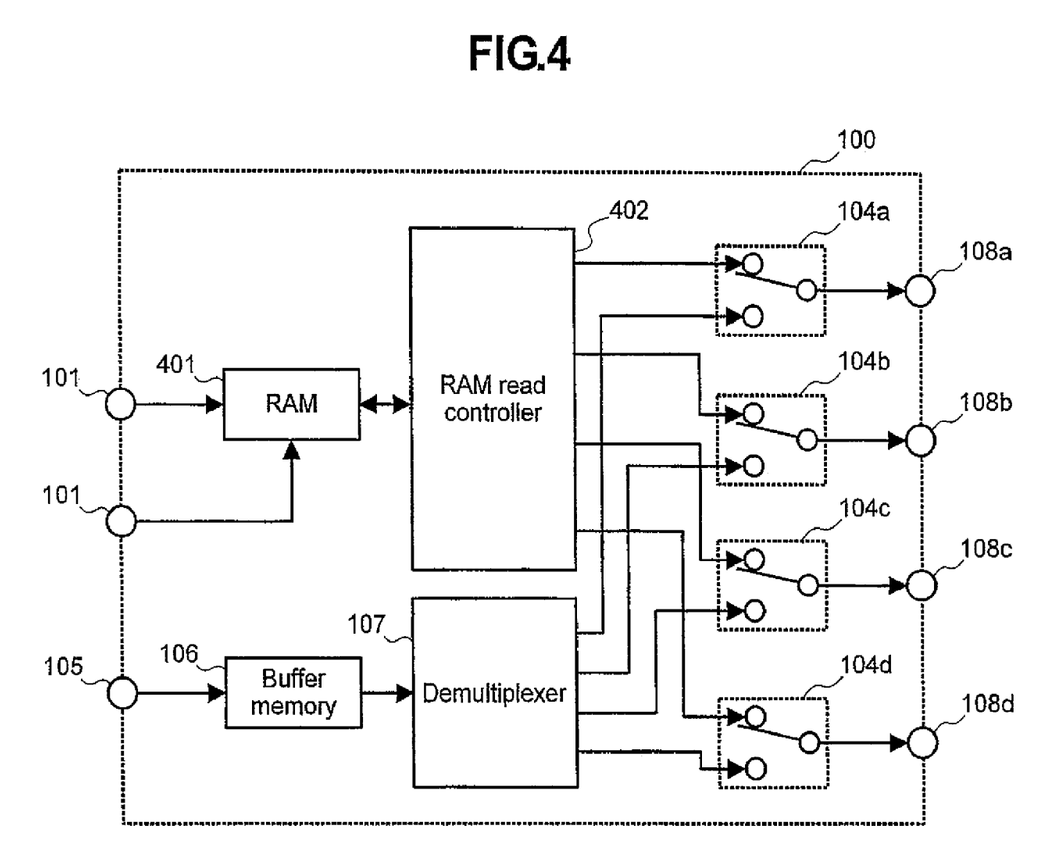
FIG. 4 is a block diagram illustrating the structure of a packet switcher according to a second embodiment of the present invention.

In the packet switcher 100 shown in FIG. 1, all data types are provided with separate specific buffer memories, which are used to buffer various packets and adjust their output timing. However, the provision of a plurality of buffer memories is at a disadvantage because it increases the circuit scale. The block diagram in FIG. 4 illustrates an alternative packet switcher that is capable of performing operations with a single memory to produce results that are equivalent to those obtained from the use of a plurality of buffer memories. This alternative packet switcher reduces the circuit scale.

In FIG. 4, the reference numeral 401 denotes a RAM (Random Access Memory), and the reference numeral 402 denotes a RAM read controller. The packet switcher shown in FIG. 4 is equipped with the RAM 401 and RAM read controller 402, instead of a plurality of buffer memories.

In a stream file data write process, the stream data is written into the RAM 401. The stream data write address to be used is controlled by the system controller 205. When a plurality of stream data are to be written into the RAM 401, the RAM 401 may be divided for use.

The stream data written in the RAM 401 is read by the RAM read controller 402. The RAM read controller 402 reads packets in various areas of the RAM 401 in accordance with the time indicated by a timestamp that is attached to each packet, and it supplies the read packets to selector switches 104a through 104d. In this instance, the RAM read controller 402 does not read the headers, which contain timestamps, and it outputs only the 188-byte MPEG packets to selector switches 104a through 104d.

As is the case with the use of the packet switcher 100 shown in FIG. 1, selector switches 104a through 104d selectively output the stream data reproduced from the data recording unit 203 and the stream data reproduced from the optical disk.

As described above, the use of one RAM instead of a plurality of buffer memories provides the same advantages as the first embodiment and reduces the circuit scale as well.

Figure 5:
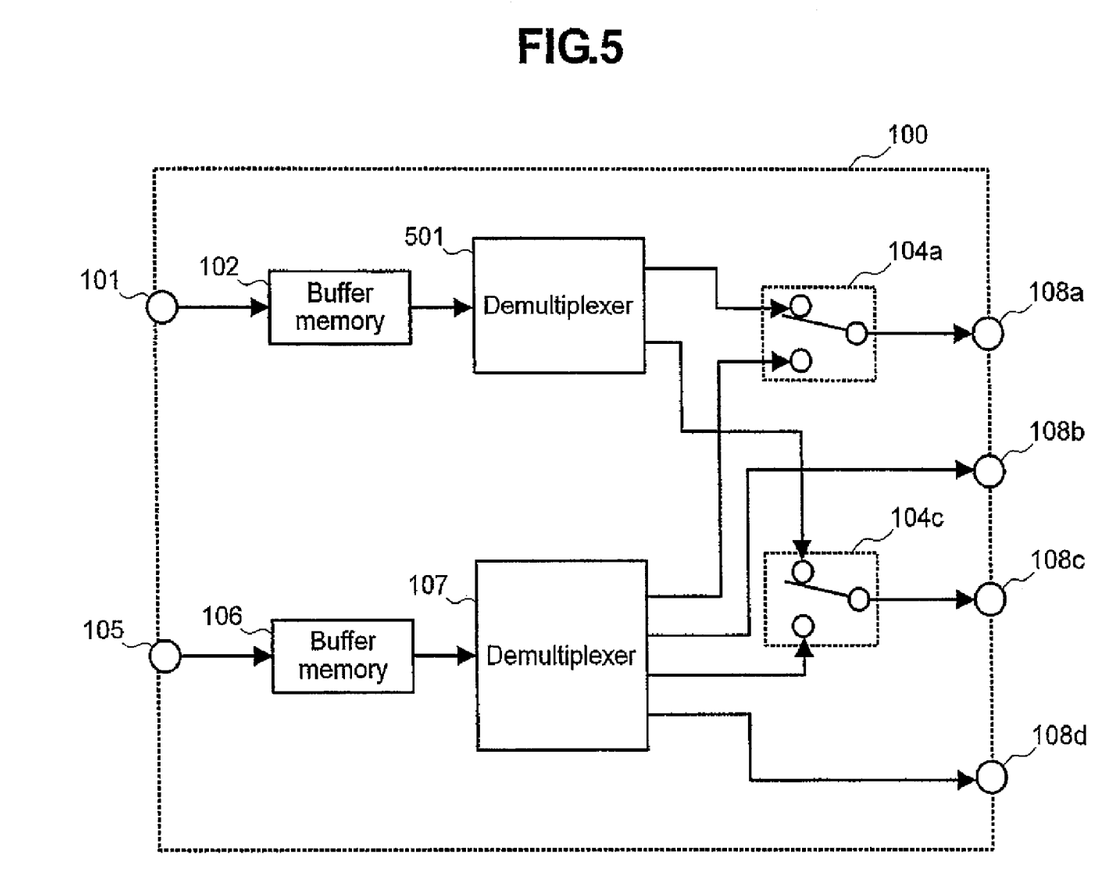
FIG. 5 is a block diagram illustrating the structure of a packet switcher according to a third embodiment of the present invention.

In the reproducing device shown in FIG. 2, the packet switcher 100 may be replaced by the packet switcher 100 shown in FIG. 5. In the latter packet switcher 100, buffer memories 102 and 106 and demultiplexers 501 and 107 are provided for both the processing system for the downloaded stream data, which is input from the input terminal 101, and the processing system for the stream data derived from the disk, which is input to the input terminal 105. The employed configuration is such that the outputs of demultiplexers 501 and 107 are selected as needed using selector switches 104a and 104c. In the present embodiment, the stream data to be downloaded comprises sub-picture data and audio data. Therefore, the employed configuration makes it possible to select the outputs of these two types of data.

If the employed configuration permits demultiplexer 501 to select video data and graphics data while a selector switch is provided to switch between the outputs of demultiplexers 501 and 107, which relate to video data and graphics data, it is possible to obtain the same functionality as that of the packet switcher shown in FIGS. 1 and 4.

What is claimed is:

1. A reproducing device for playing back data from a recording medium, comprising:
    a plurality of play back circuits for reading first stream data and second stream data from a recording medium, each of the first stream data and the second stream data having a plurality of fixed-length packets, and each fixed-length packet having a timestamp which indicates a transmit timing in units of the fixed-length packet, where the first stream data includes first audio data, first subtitle data, and first graphics data, and where the second stream data includes second audio data, second subtitle data and second graphics data;
    a first timing adjustment circuit for adjusting a transmit timing of the first stream data according to the timestamp;
    a second timing adjustment circuit for adjusting a transmit timing of the second stream data according to the timestamp;
    a plurality of selection circuits for conducting plural selections, including:
        a first selection to select between the adjusted first audio data and the adjusted second audio data,
        a second selection to select between the adjusted first subtitle data and the adjusted second subtitle data, and
        a third selection to select between the adjusted first graphics data and the adjusted second graphics data,
        wherein the first, second and third selections are able to perform selection independently from each other;
    a plurality of output circuits for outputting the audio data, the subtitle data and the graphics data selected by the selection circuits;
    wherein the first stream data and the second stream data are reproduced synchronously; and
    wherein the subtitle data and the graphics data from the selection circuits are superimposed together with each other and outputted.

2. A reproducing method of playing back data from a recording medium, comprising:
   reading first stream data and second stream data from a recording medium, each of the first stream data and the second stream data having a plurality of fixed-length packets, and each fixed-length packet having a timestamp which indicates a transmit timing in units of the fixed-length packet, where the first stream data includes first audio data, first subtitle data, and first graphics data, and where the second stream data includes second audio data, second subtitle data and second graphics data;
   adjusting a transmit timing of the first stream data and second stream data according to the timestamp;
   conducting plural selections, including:
      a first selection to select between the first adjusted audio data and the adjusted second audio data,
      a second selection to select between the adjusted first subtitle data and the adjusted second subtitle data, and
      a third selection to select between the adjusted first graphics data and the adjusted second graphics data, where the first, second and third selections are able to perform selection independently from each other; and
   outputting the selected audio data, the subtitle data and the graphics data;
   wherein the first stream data and the second stream data are reproduced synchronously; and
   wherein the selected subtitle data and the graphics data are superimposed and outputted.

3. A reproducing device for playing back data from a recording medium, comprising:
   a play back means for reading first stream data and second stream data from a recording medium, each of the first stream data and the second stream data having a plurality of fixed-length packets, and each fixed-length packet having a timestamp which indicates a transmit timing in units of the fixed-length packet, where the first stream data includes first audio data, first subtitle data, and first graphics data, and where the second stream data includes second audio data, second subtitle data and second graphics data;
   a first timing adjustment means for adjusting a transmit timing of the first stream data according to the timestamp;
   a second timing adjustment means for adjusting a transmit timing of the second stream data according to the timestamp;
   a selection means for conducting plural selections, including:
      a first selection to select between the adjusted first audio data and the adjusted second audio data,
      a second selection to select between the adjusted first subtitle data and the adjusted second subtitle data,
      and a third selection to select between the adjusted first graphics data and the adjusted second graphics data,
      wherein the first, second and third selections are able to perform selection independently from each other;
   an output means for outputting the audio data, the subtitle data and the graphics data selected by the selection circuits;
   wherein the first stream data and the second stream data are reproduced synchronously; and
   wherein the subtitle data and the graphics data from the selection circuits are superimposed together with each other and outputted.

* * * * *